Dec. 15, 1925.  
E. B. MEAD  
BRAKE CONTROL  
Filed May 13, 1925  
1,565,383
6 Sheets-Sheet 5
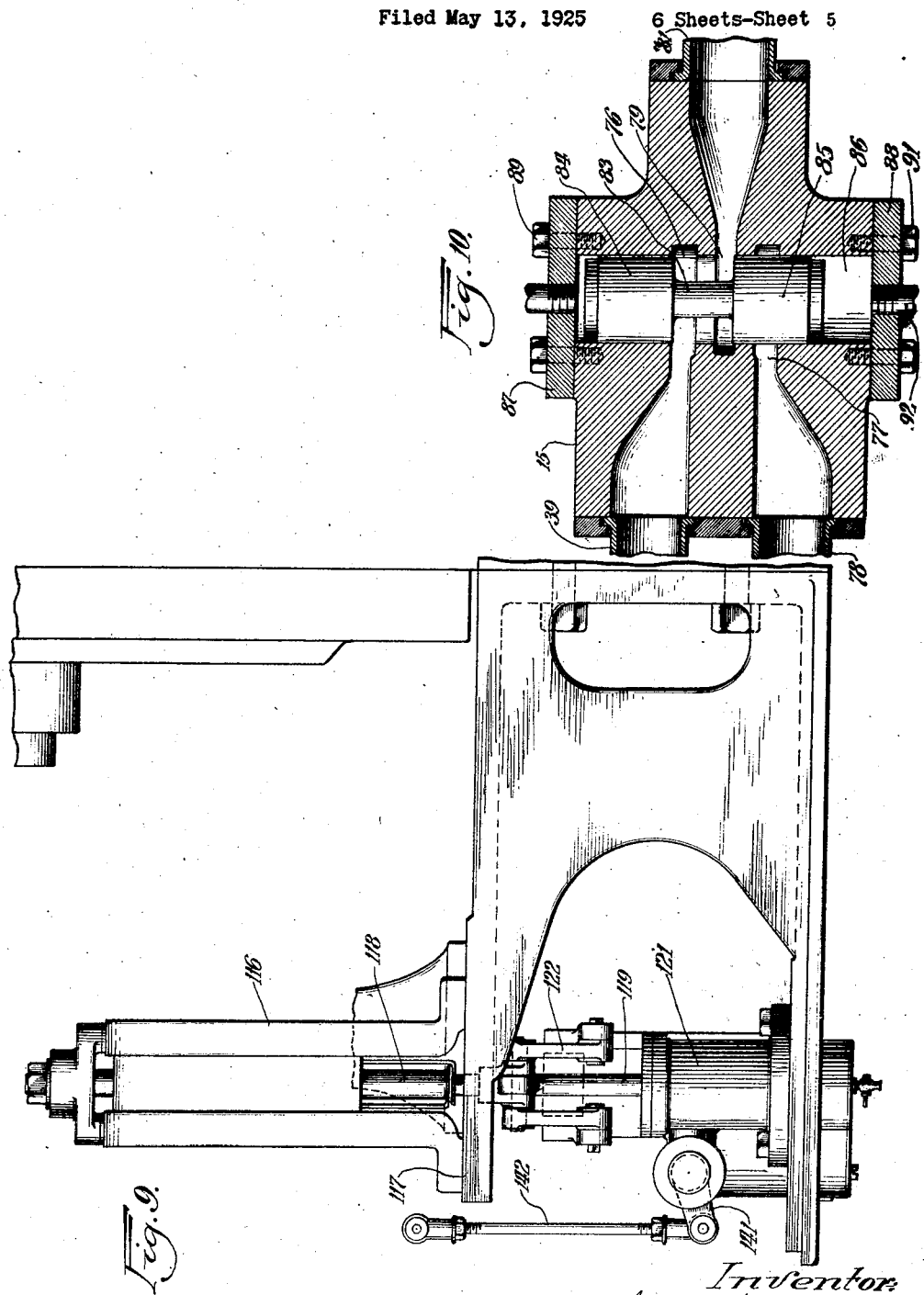

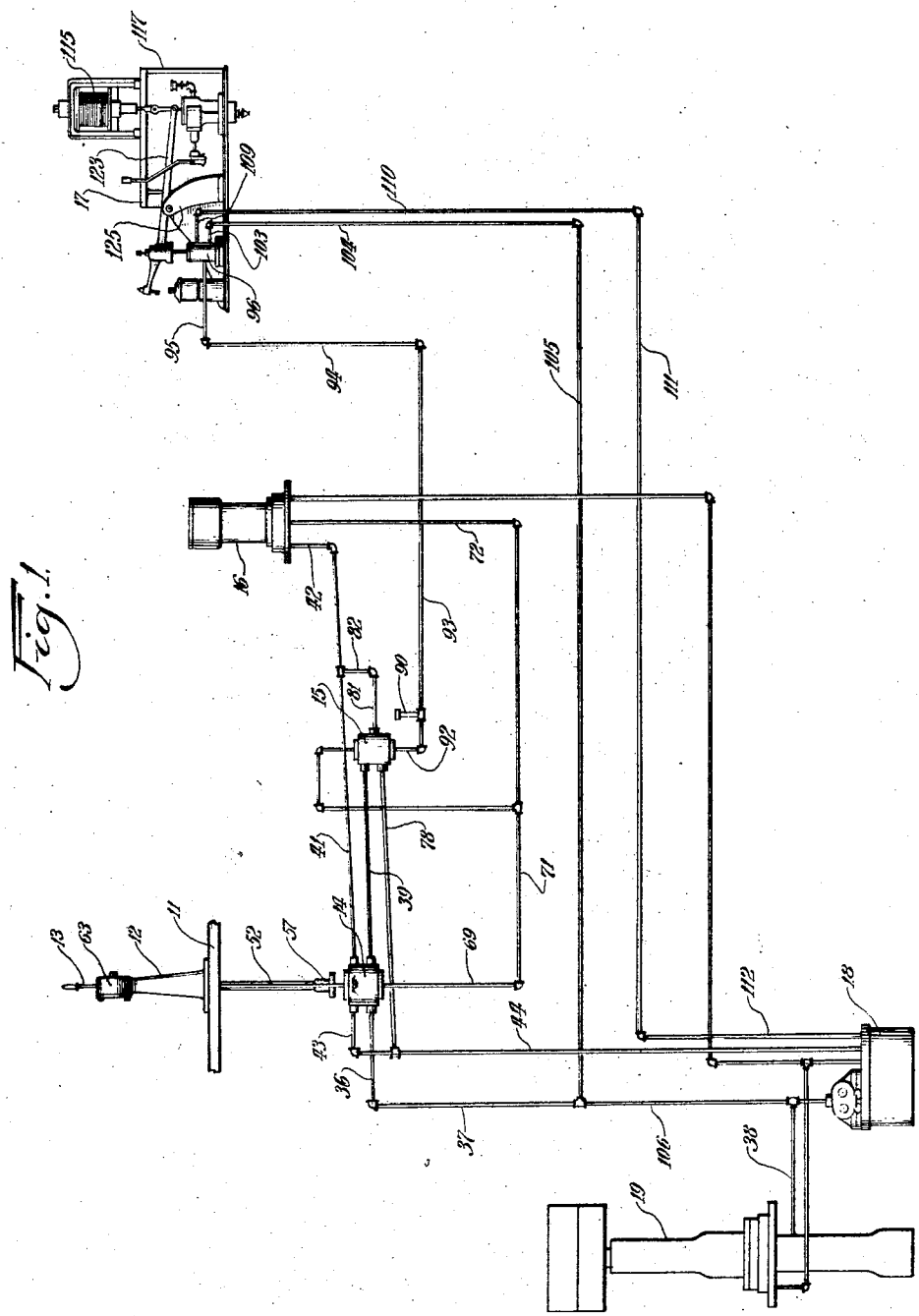

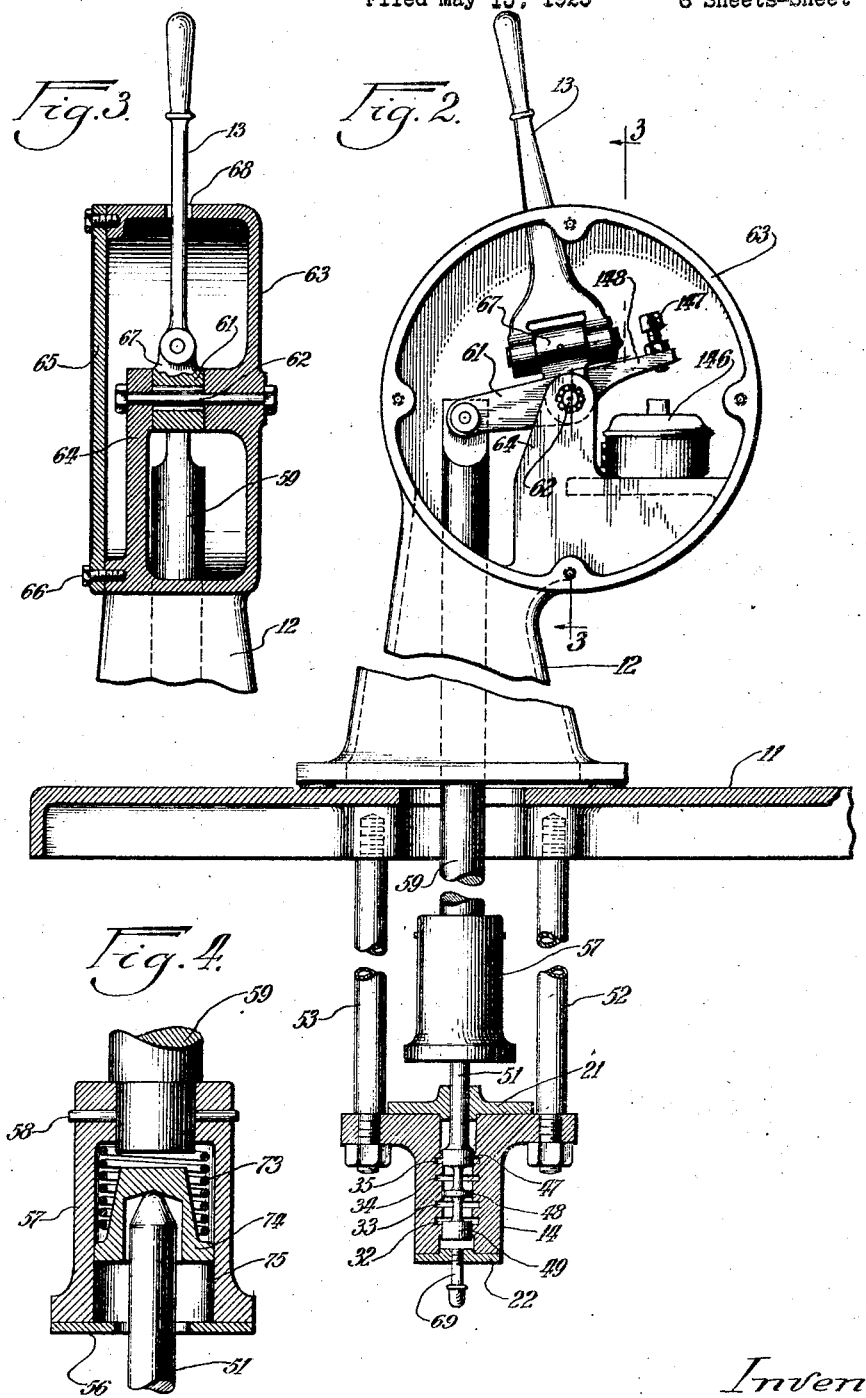

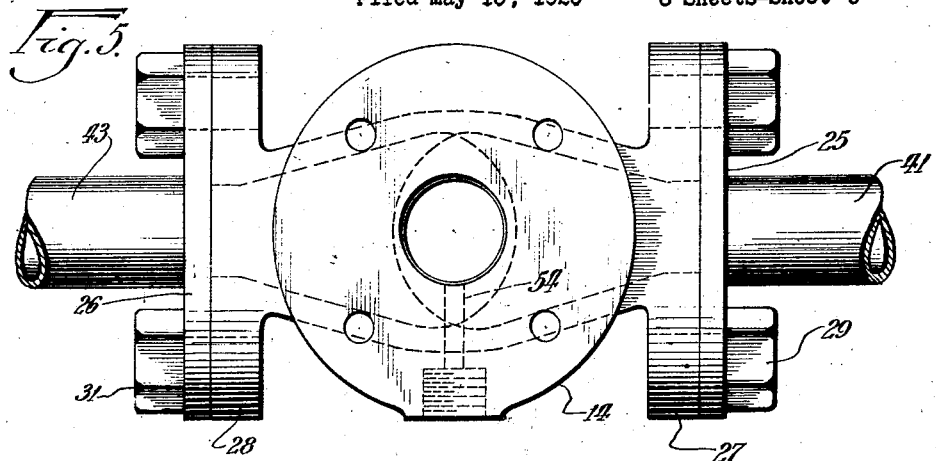
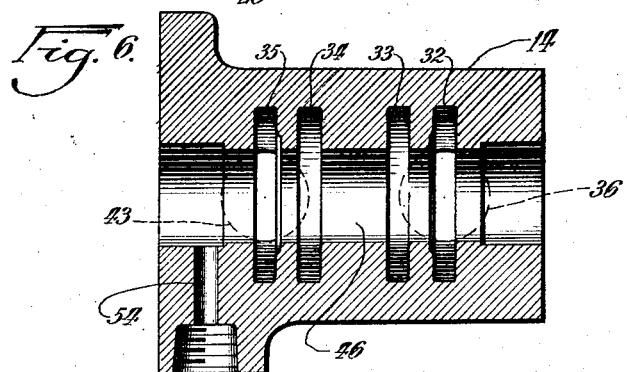
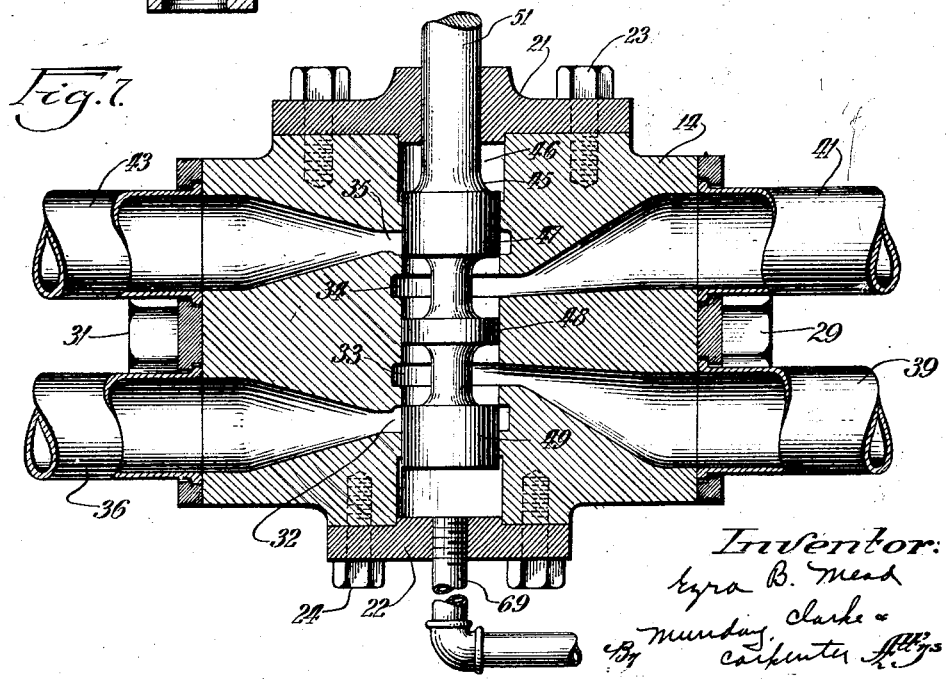

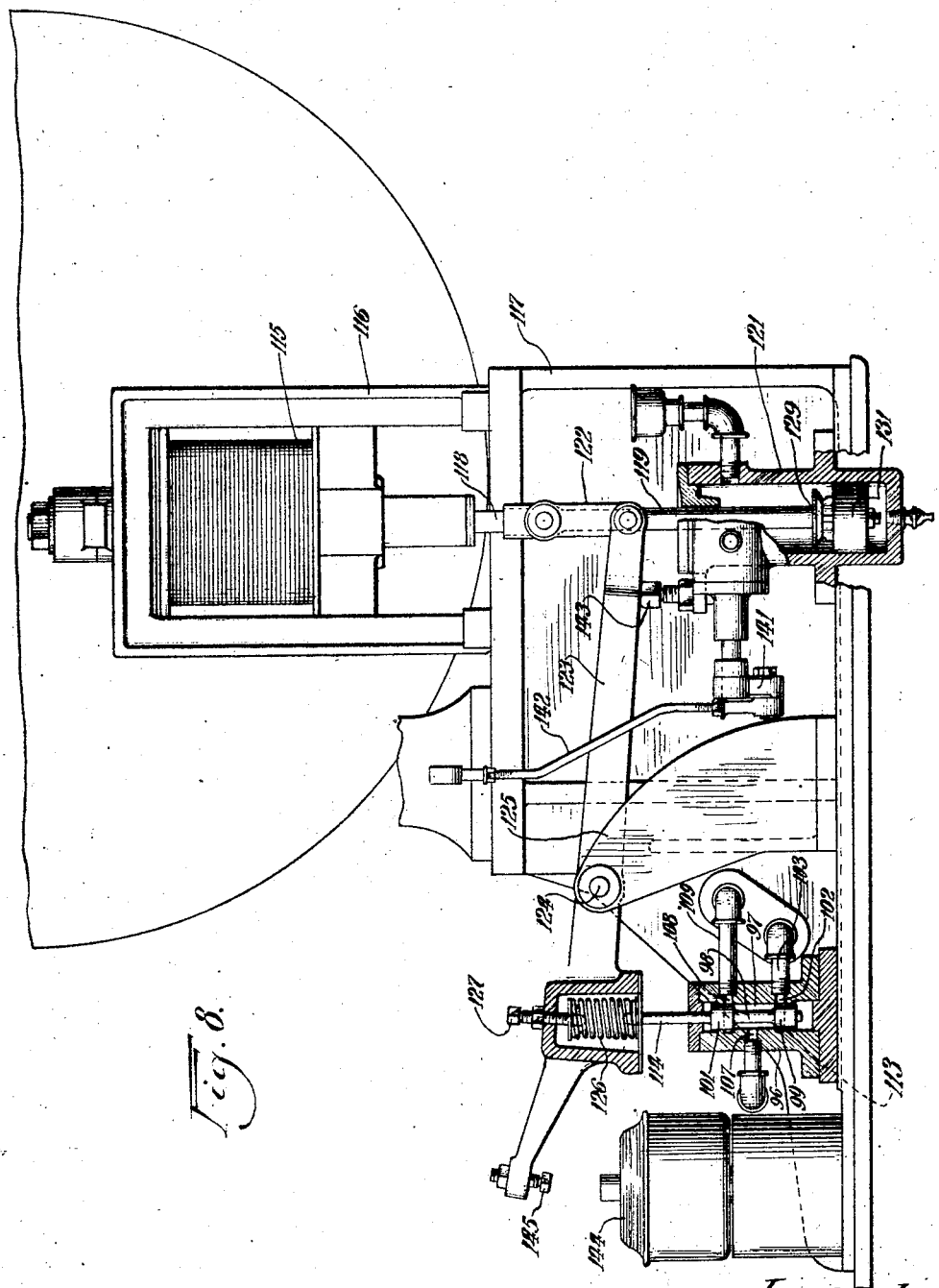

Dec. 15, 1925.  E. B. MEAD  1,565,383

BRAKE CONTROL

Filed May 13, 1925    6 Sheets-Sheet 6

Inventor:
Ezra B. Mead
By Munday, Clarke & Carpenter Attys.

Patented Dec. 15, 1925.

1,565,383

UNITED STATES PATENT OFFICE.

EZRA B. MEAD, OF OTTUMWA, IOWA, ASSIGNOR TO OTTUMWA IRON WORKS, OF OTTUMWA, IOWA, A CORPORATION OF IOWA.

BRAKE CONTROL.

Application filed May 13, 1925. Serial No. 29,860.

*To all whom it may concern:*

Be it known that I, EZRA B. MEAD, a citizen of the United States, residing in Ottumwa, in the county of Wapello and State of Iowa, have invented a new and useful Improvement in Brake Controls, of which the following is a specification.

This invention relates to brake control mechanism for mine hoists and the like, and has for its general object the provision of an improved proportional pressure brake control system employing the same general principle of operation disclosed in my prior Patent No. 1,373,195, granted March 29, 1921.

As explained in said prior patent, the operator, when applying his brakes by power so that he cannot directly feel the reaction from the contact of the brake shoes with the brake drum or ring, is enabled, by the use of my control system, to tell both from the position of the brake lever and the pressure thereon just what extent of braking action he is obtaining, irrespective of the condition of wear and adjustment of the brake parts, this being rendered possible by means producing pressure on the brake lever directly proportional to the extent of braking action. The power used to actually apply the brakes is preferably a heavy weight, suitably connected with the brake band or shoes and normally held in raised position with the brakes released by means of fluid pressure in a thrust cylinder beneath the weight. In accordance with the proportional pressure principle, the pressure in said thrust cylinder is controlled so that it varies inversely as the force applied to the brake lever.

The present invention, while directed to the improvement of the system as a whole, has for a more particular object the provision of improved devices for applying the brakes in emergency. To this end, electrically controlled means are provided for automatically operating the brakes under certain predetermined conditions, such as too great speed in approaching the landings or failure of power in the line. The invention contemplates that, in this event, the operator may assist in applying the brakes harder, but cannot release them until certain predetermined conditions are complied with. Among the instrumentalities provided for the accomplishment of the aims of the invention are an improved dashpot construction and control therefor and a relay valve provided in one of two lines of communication between an operator's valve and the thrust cylinder which controls the position of the brake weight.

Another feature of the invention is the provision of means for preventing movement of the operator's lever, resulting from a dancing movement of the valve, which ordinarily occurs in maintaining the desired pressure, thus giving the lever a smooth operation without interfering with the proportional control principle of operation hereinabove referred to.

Numerous other objects and advantages of the invention will be apparent as it is better understood from the following description, which, taken in connection with the accompanying drawings, discloses a preferred embodiment thereof.

Referring to the drawings,

Figure 1 is a diagrammatic view of a proportonal pressure brake control system in which my invention is embodied;

Fig. 2 is a view, partially in elevation and partially in section of the operator's stand and valve, certain parts being broken away for convenience in illustration;

Fig. 3 is a sectional view, taken substantially upon the section line 3—3 in Fig. 2;

Fig. 4 is a sectional detail of the weight associated with the operator's valve;

Fig. 5 is a top plan view of the operator's valve shown at the bottom of Fig. 2;

Fig. 6 is a vertical section through said valve, looking toward the left in Fig. 5;

Fig. 7 is a cross-section of the valve, taken longitudinally of Fig. 5;

Fig. 8 is a view, partially in section and partially in elevation, of the emergency control;

Fig. 9 is an end elevation of the latter, looking toward the left in Fig. 8;

Fig. 10 is a sectional view of the relay valve;

Figure 13:
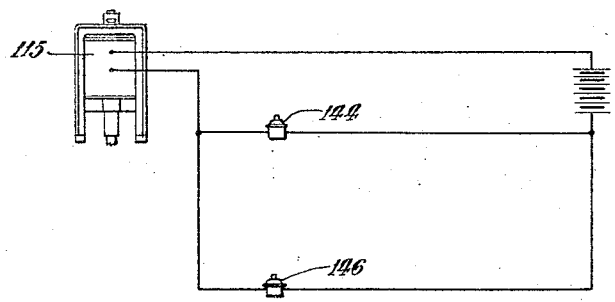
Fig. 13 is a diagram showing the connections and push buttons for energizing the emergency solenoid.

Referring first to Fig. 1, the reference character 11 indicates the operator's stand upon which is located an upright or standard 12, carrying an operating lever 13. The reference character 14 indicates the operator's valve, 15 the relay valve, 16 the thrust cylinder, 17 the emergency control, 18 the sump tank and 19 the accumulator, all of which will be later more particularly described.

The details of the operator's valve are shown in Figs. 5 to 7, to which attention is now directed. The valve casing 14 is formed in the present instance, with four ports and is closed at the top and bottom by plates 21 and 22 secured thereto by screws 23 and 24, side plates 25 and 26 being provided and attached to flanges 27 and 28 on the valve casing by means of screws 29 and 31. The four ports referred to are indicated, respectively, by the reference characters 32, 33, 34 and 35. The port 32 communicates through pipes 36, 37 and 38 with the accumulator 19 (see Fig. 1). The port 33 communicates through a pipe 39 with the relay valve 15. The port 34 is connected by pipes 41 and 42 with the thrust cylinder 16 and the port 35 is in communication, through pipes 43 and 44, with the sump tank 18. A valve member 45 is movably mounted in a valve chamber 46 in the wall of which the ports 32, 33, 34 and 35 are formed. Said valve has upper, intermediate and lower enlarged parts 47, 48 and 49 in contact with the wall of the valve chamber and is formed with a valve stem 51 extending upwardly through the plate 21. The valve is suspended from the platform 11 by means of rods 52 and 53 (see Fig. 2). A port 54 is provided at the top of the valve and communicates with the top of the valve chamber so that there will be no pressure on the plate 21.

The upper end of the valve stem 51 extends through a bottom plate or washer 56 upon a weight 57 secured by means of a pin 58 to the lower end of a rod 59 extending through the standard 12 and connected at its upper end to a lever 61 pivoted at 62 within a casing 63 carried at the upper end of the standard 12, the pivot pin 62 being journaled in one wall of said casing and at the opposite end in an upwardly extending bracket 64 within said casing. A removable plate 65 is secured by means of screws 66 to one side of said casing. The hand lever 13 is secured to a lug 67 on the top of the lever 61 and is movable in a slot 68 in the top of the casing 63.

The bottom of the valve chamber 46 is in communication, through pipes 69, 71 and 72, with the thrust cylinder 16 so that the pressure on the bottom of the valve 45 is the same as that in said thrust cylinder. The operation of the valve is upon the proportional pressure principle similar to that of my prior Patent No. 1,373,195. As clearly shown in said patent, the brakes are applied by means of a weight suitably connected with the brake shoes, which are thereby pressed against a brake ring, said weight being adapted to be lifted to release the brake by fluid pressure in the thrust cylinder 16. The pressure of the weight 57 upon the valve stem 51 normally holds the valve 45 in substantially the position shown in Fig. 7, in which the thrust cylinder is shut off from both the accumulator and sump tank, there being, however, a slight dancing movement of said valve responsive to pressure maintained in said thrust cylinder to hold the brake applying weight in position with the brakes released. When the pressure in the bottom of the valve chamber 46, which is the pressure in the thrust cylinder, exceeds the pressure exerted by the weight 57 upon the valve stem 51, the valve 45 will be raised, permitting flow of oil from the thrust cylinder to the sump tank and allowing the brake applying weight to descend to set the brakes. As the weight on the valve stem becomes greater than the pressure in the bottom of the valve, due to lower pressure in the thrust cylinder, the valve lowers and allows flow of oil to the thrust cylinder from the accumulator through the relay valve 15. The valve, therefore, maintains in the thrust cylinder, if not interrupted by the relay valve, a pressure corresponding to the pressure on the valve stem. The weight 57 may be lifted by the operator by pulling the lever 13 toward him, assuming that he stands at the right in Fig. 2, thus lessening the pressure on the valve stem and permitting the pressure beneath the valve to lift the latter, the extent of application of the brakes depending upon the amount of oil thus withdrawn from the thrust cylinder. A spring 73 is carried within the weight 57, being disposed over a cap member 74 into which extends the upper end of the valve stem 51. Said member 54 is movable in a chamber 75 in the weight and the spring is normally compressed by said weight, inasmuch as the operator's lever is free in its forward position, as shown in Fig. 2. Said spring thus serves to give the operator an appreciable amount of motion in lifting the weight from the valve stem and performs the further function of allowing the valve to dance slightly in maintaining the pressure in the thrust cylinder, without forcing the operator to move his hand. This obviates the feeling to the operator similar to that of a fishpole when a fisherman has a bite and gives the lever a smooth operation. The weight is adjusted to maintain a pressure in the thrust cylinder, holding the brake weight in position which enables the operator to cause the brake to settle to the drum by slight movement of the lever 13. As he pulls harder upon said lever, and lifts more and more of the weight off the valve stem, the spring helping him less and less, the pressure in the thrust cylinder continues to reduce, increasing the amount of weight which must be supported by the brake shoes, pressing against the brake ring and thereby increasing the amount of braking. When the operator has pulled the lever toward him to the end of the slot 68, the member 74 is resting upon the bottom plate 56 of the weight and is entirely free from the valve stem. The operator's lever has but one latch and that is for the fully applied position of the weight, free from the valve stem.

The flow from the operator's valve to the thrust cylinder, as previously explained, is through the pipe 39 and relay valve 15, which valve will now be described, reference being had particularly to Figs. 1 and 10 of the drawings. Said valve is provided with an upper port 76, communicating with the operator's valve through the pipe 39, a lower port 77 communicating with the sump tank through a pipe 78 and the pipe 44, a middle port 79 being connected through pipes 81, 82 and the pipes 41 and 42 with the thrust cylinder. A valve member 83, having upper and lower enlarged parts 84 and 85 is movable in a valve chamber 86, closed at the top and bottom by plates 87 and 88 secured, respectively, to the valve casing by means of screws 89 and 91. This valve operates in emergency to disconnect the operator from the thrust cylinder and to bleed said cylinder for the purpose of automatically applying the brakes.

The bottom of said valve is in communication, through pipes 92, 93, 94 and 95 with a pilot valve 96 forming a part of the emergency device 17. Said pilot valve is adapted to maintain the maximum pressure desired in the thrust cylinder, this pressure, under normal conditions, holding the valve 83 in the raised position shown in Fig. 10, establishing communication between the operator's valve and the thrust cylinder. The pilot valve is controlled in manner to be presently described and is adapted to reduce the pressure in the bottom of the valve 15 when emergency conditions arise, so that the valve member 83 will be moved downwardly from the position shown in Fig. 10 to position cutting off communication between the operator's valve and the thrust cylinder and opening said cylinder to exhaust. When this occurs, it will be apparent that the operator can no longer introduce pressure into said thrust cylinder to release the brakes, but he can apply the brakes harder by reason of the fact that a second line of communication between the operator's valve and the thrust cylinder, not passing through the relay valve, is provided, this being through the pipes 41 and 42. An air chamber 90 is provided in the pipe 93 near the relay valve 15 and is adapted to give a quick response in position of the relay valve for slight changes in pressure of the thrust cylinder. Due to compression of the air in this chamber, the pilot valve does not necessarily have to move to allow the relay valve to dance and maintain the desired pressure called for by the pilot valve.

Referring now particularly to Fig. 8, the emergency device 17 will be described. The pilot valve 96 is shown in section at the left of said figure and comprises a casing providing the valve chamber 97 in which a valve member 98 is positioned, this valve member being provided with enlarged parts 99 and 101 contacting with the wall of the chamber. Three ports are provided in this valve. The one indicated by the reference character 102 is connected through pipes 103, 104, 105, 106 and the pipe 38 with the accumulator 19. The middle port 107 is connected with the bottom of the relay valve through the pipes heretofore described and the upper port 108 communicates with the sump tank through pipes 109, 110, 111, 112. There is a small hole 113 drilled through the lower part 99 of the valve member 98 and connecting the middle chamber of the valve to the bottom chamber without communicating with the lower port 102. The pressure beneath the valve is thus the same as that in the middle port. A valve stem 114 extends upwardly from the top of the valve and when the pressure on this valve stem is greater than the pressure beneath the valve, which is the pressure in the middle port, said valve lowers, putting the middle port into communication with the accumulator and thus raising the pressure in said port and in the lower part of the relay valve. If the pressure underneath the valve member 98 is greater than the pressure on the valve stem, said valve member rises and puts the middle port in communication with the sump tank. The operation of the pilot valve, therefore, is such as to maintain a pressure in the middle port 107, which is connected to the bottom of the relay valve, exactly proportional to the pressure administered to the valve stem 114. The pressure upon said stem is controlled by mechanism which will now be described. A solenoid 115 is mounted in a bracket 116 at the right of a frame 117, viewing Fig. 8, the core 118 of said solenoid being connected with the piston rod 119 of a dashpot 121 and also through links 122 with a horizontal lever 123, pivoted at 124 to an upstanding bracket 125 in the frame 117. When the solenoid is energized, which is the normal condition when the apparatus is operating, it raises the core 118, thus turning the lever 123 in counter-clockwise direction and compressing a spring 126, carried in one end of said lever, against the valve stem 114. This, obviously, holds the valve member 98 in position establishing communication between the relay valve and the accumulator pressure, thereby maintaining the desired pressure at the bottom of said relay valve. The pressure on the valve stem may be varied by means of an adjusting screw 127 extending through the top of the lever 123 and acting upon the spring 126.

Figure 11:
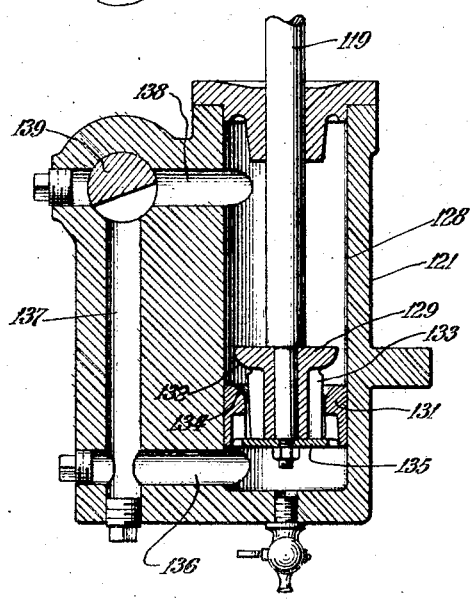
Fig. 11 is a vertical sectional view of the dashpot shown at the right in Fig. 8.
Figure 12:
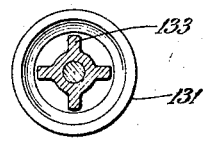
Fig. 12 is a plan and sectional view of the dashpot valve and plunger.

The dashpot 121 is shown at the right of Fig. 8 and in detail in Figs. 11 and 12. The chamber 128 of said dashpot is adapted to be filled with a very thin oil and the rod 119 carries a piston movable in said chamber and formed of two relatively movable parts 129 and 131. The portion 129 is connected directly to the piston rod or stem 119 of the dashpot and is formed with a valve part 132 and radial ribs 133 therebeneath, said valve part being adapted to normally rest upon a valve seat 134 formed in the outer member 131. When the solenoid raises its core, the middle portion of the piston is first lifted, which opens communication with the part of the chamber beneath the piston. The outer part 131 is then lifted by means of a washer 135 secured to the bottom of the middle portion 129. When the solenoid is deenergized and its core dropped, there is a certain amount of free drop before the middle portion of the piston of the dashpot seats itself on the outer portion. As soon as it seats itself on the outer portion, the oil must pass from below to above the piston before said piston can settle further. There is a port 136 at the bottom of the dashpot communicating with a vertical passage 137, in turn communicating with a port 138 at the top of the dashpot, a valve 139 being provided at the top of the passage 137. This valve is adapted to be rotated by means of an arm 141 and a rod 142, connected with suitable controlling mechanism (not shown) to regulate the extent of opening of said valve, thereby determining how rapidly the piston may lower after the middle portion 129 is seated upon the outer portion 131. This obviously determines how rapidly the brake shall apply, since the pressure upon the stem 114 of the relay valve can only be released by the passing of oil from beneath the piston of the dashpot to the portion of the chamber above said piston. The control valve 139 is preferably so regulated that, for middle positions of the cage, the valve is very nearly closed, allowing the brake to apply in emergency application very slowly, the valve being opened wide near the end of the trip, allowing the brake to apply very rapidly.

A set screw 143 is provided in the top of the dashpot casing and is adapted to support the horizontal lever 123 when the right hand end of said lever is in its lowest position. This screw provides adjustment for limiting the extent of braking action in accordance with the conditions of service. In the case of slope hoists, this is limited to be within the strength of the hitchings to avoid the brake applying so hard as to break the latter and allow the train to run away on the grade. In this case, the set screw would be high enough to hold the spring 126 under appreciable compression. In the case of shaft hoists, however, the screw should be low enough to allow said spring to entirely clear the valve stem, so as to allow full braking effort.

Attention is now directed to Figs. 2, 8 and 13 of the drawings, showing electrical devices which render it necessary for the operator to place his hand lever in the fully applied position before releasing the brake, which must be done with his own hand. A push button 144 is provided at the left of the frame 117, shown in Fig. 8, this push button being shown also in Fig. 13 and being adapted to be operated by means of the set screw 145 carried in the end of the lever 123. A second push button 146 is shown in Fig. 2 and is adapted to be operated by means of a set screw 147 carried in an extension 148 of the lever 61 connected to the operator's lever 13, this push button being also shown in the wiring diagram of Fig. 13. The solenoid 115, as shown in Fig. 13, takes its energy through one of the push buttons 144 and 146. If said solenoid is not energized, the push button 144 on the emergency device is open, it being pointed out, in this connection, that the solenoid cannot be energized through this push button, but only through the push button 146 on the operator's stand. It is obvious, therefore, that the operator must place his lever in the fully applied position in order to energize the solenoid, the raising of the core 118 thus resulting in establishing contact between the set screw 145 and the push button 144, which maintains the energy of the solenoid, regardless of whether the push button 146 is open or not, until the current is again interrupted by some emergency device, or by failure of line current. The means for deenergizing the solenoid in emergency are not shown, since the invention resides in the control mechanism, the emergency devices of which are brought into operation by deenergizing said solenoid in whatever manner the latter may occur.

From the foregoing, it is believed that the operation of the system will be obvious. The operator, by moving the lever 13 toward the right, viewing Fig. 2, lifts the weight 57 from the stem 51 of the operator's valve, being assisted at first by the spring 73, and when the pressure on said stem becomes less than the pressure beneath the valve, which is the pressure in the thrust cylinder, the valve rises, opening said thrust cylinder to exhaust and applying the brakes in accordance with the extent of moving of said lever 13. Movement of the lever in the opposite direction allows the weight 57 to act upon the valve stem, moving the valve downwardly, cutting off communication with the sump tank and admitting sufficient pressure from the accumulator to lift the brake weight and release the brakes. This pressure can only be admitted through the relay valve 15, though when the latter is operated in emergency, the operator can still exhaust pressure from the thrust cylinder by reason of the double line of communication hereinbefore described.

The pressure in the bottom of the relay valve 15 is normally sufficient to hold the valve member 83 in raised position, establishing communication between the operator's valve and the thrust cylinder, this pressure, however, being adapted to be reduced in emergency, the pressure in the thrust cylinder then causing the member 83 to move downwardly, preventing further admission of pressure through the operator's valve and opening the thrust cylinder to exhaust. The pressure at the bottom of the relay valve is controlled by means of the pilot valve 96, which normally maintains the maximum pressure required to apply the brakes. When the solenoid 115 is deenergized, through failure of line current or any other emergency conditions, the valve member 98 of the pilot valve is raised, establishing communication with the sump tank and thereby reducing the pressure transmitted by said pilot valve to the bottom of the relay valve. After the emergency devices have operated, the brakes are released by the operator himself, this being possible only after communication is established between the operator's valve and the relay valve, which is accomplished after the solenoid 115 has been energized and the valve member 98 depressed. Inasmuch as said solenoid can only be energized by the push button 146 at the operator's stand, it follows that the operator must place the lever in the fully applied position before he can release the brakes.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A brake control, comprising in combination fluid pressure means associated with the brake applying mechanism for controlling the action thereof, a source of fluid under pressure, a plurality of lines of communication between said pressure source and said means, and devices including a manipulative member whereby the operator may admit fluid to said means through one of said lines of communication and exhaust the same through either thereof to control the brake application.

2. A brake control, comprising in combination fluid pressure means associated with the brake applying mechanism for controlling the action thereof, a source of fluid under pressure, a plurality of lines of communication between said pressure source and said means, devices including a manipulative member whereby the operator may admit fluid to said means through one of said lines of communication and exhaust the same through either thereof to control the brake application, and means for shutting off said admitting line of communication in emergency.

3. A brake control, comprising in combination fluid pressure means associated with the brake applying mechanism for controlling the action thereof, a source of fluid under pressure, a plurality of lines of communication between said pressure source and said means, devices including a manipulative member whereby the operator may admit fluid to said means through one of said lines of communication and exhaust the same through either thereof to control the brake application, means for shutting off said admitting line of communication in emergency, and automatic devices for controlling the operation of said last-mentioned means.

4. A brake control, comprising in combination fluid pressure means associated with the brake applying mechanism for controlling the action thereof, a source of fluid under pressure, a control valve, a plurality of lines of communication between said valve and said fluid pressure means, and a manipulative member for operating said valve, the latter being adapted to admit fluid to said means through one only of said lines of communication and to exhaust the same through either thereof to control the brake application.

5. A brake control, comprising in combination fluid pressure means associated with the brake applying mechanism for controlling the action thereof, a source of fluid under pressure, a control valve, a plurality of lines of communication between said valve and said fluid pressure means, a manipulative member for operating said valve, the latter being adapted to admit fluid to said means through one only of said lines of communication and to exhaust the same through either thereof to control the brake application, and means for automatically shutting off said admitting line of communication in emergency.

6. A brake control, comprising in combination fluid pressure means associated with the brake applying mechanism for controlling the action thereof, a source of fluid under pressure, a control valve, a plurality of lines of communication between said valve and said fluid pressure means, a manipulative member for operating said valve, the latter being adapted to admit fluid to said means through one only of said lines of communication and to exhaust the same through either thereof to control the brake application, and a relay valve automatically operable to shut off said admitting line of communication in emergency.

7. A brake control, comprising in combination fluid pressure means associated with the brake applying mechanism for controlling the action thereof, a control valve communicating with a source of fluid under pressure and with said fluid pressure means and including a movable valve member subject to the pressure in said means, a manipulative device for controlling said valve member, and connections between said device and said member including means for preventing movement of said device responsive to slight movements of the valve member in maintaining pressure in said fluid pressure means.

8. A brake control, comprising in combination fluid pressure means associated with the brake applying mechanism for controlling the action thereof, a control valve communicating with a source of fluid under pressure and with said fluid pressure means and including a movable valve member subject to the pressure in said means, a manipulative device for controlling said valve member, and connections between said device and said member including a weight acting upon said member and a spring interposed between said weight and said member for preventing movement of said device responsive to slight movements of the valve member in maintaining pressure in said fluid pressure means.

9. A brake control, comprising fluid pressure means associated with the brake applying mechanism for controlling the action thereof, a source of pressure medium, devices under the control of the operator for controlling the flow of said pressure medium to and from said means, and emergency control mechanism comprising a relay valve through which the pressure medium normally flows to said means to release the brake, and means operable in emergency for operating said valve to prevent further flow of said medium to said means and to open the latter to exhaust to apply the brake.

10. A brake control, comprising fluid pressure means associated with the brake applying mechanism for controlling the action thereof, a source of pressure medium, devices under the control of the operator for controlling the flow of said pressure medium to and from said means, and emergency control mechanism comprising a relay valve through which the pressure medium normally flows to said means to release the brake, and means operable in emergency for operating said valve to prevent further flow of said medium to said means and to open the latter exhaust to apply the brake, said valve operating means including a pilot valve normally maintaining sufficient pressure in said relay valve to open the same to said source and automatic means for operating said pilot valve to reduce the pressure administered thereby to said relay valve and thus to permit operation of the latter as aforesaid.

11. A brake control, comprising fluid pressure means associated with the brake applying mechanism for controlling the action thereof, a source of pressure medium, devices under the control of the operator for controlling the flow of said pressure medium to and from said means, and emergency control mechanism comprising a relay valve through which the pressure medium normally flows to said means to release the brake and means operable in emergency for operating said valve to prevent further flow of said medium to said means and to open the latter to exhaust to apply the brake, said valve operating means including a pilot valve normally maintaining sufficient pressure in said relay valve to open the same to said source, automatic means for operating said pilot valve to reduce the pressure administered thereby to said relay valve and thus to permit operation of the latter as aforesaid, and means interposed between said relay valve and said pilot valve for taking up slight movements of the former due to the opposed pressures thereon and preventing transmission of said movements to the pilot valve.

12. A brake control, comprising fluid pressure means associated with the brake applying mechanism for controlling the action thereof, a source of pressure medium, devices under the control of the operator for controlling the flow of said pressure medium to and from said means, and emergency control mechanism comprising a relay valve through which the pressure medium normally flows to said means to release the brake and means operable in emergency for operating said valve to prevent further flow of said medium to said means and to open the latter to exhaust to apply the brake, said valve operating means including a pilot valve normally maintaining sufficient pressure in said relay valve to open the same to said source and an electrical control for operating said pilot valve to reduce the pressure administered thereby to said relay valve and thus to permit operation of the latter as aforesaid.

13. A brake control, comprising a fluid pressure device adapted to release the brake when the pressure therein is increased and to apply the same when said pressure is reduced, means under the control of the operator for admitting a pressure medium to said device and for exhausting the same, said means enabling the operator to exhaust said pressure medium from said device at all times, and means operating in emergency to prevent admission of further pressure to said device.

14. A brake control, comprising a thrust cylinder adapted to lift an associated brake weight or the like to release the brake, a source of fluid under pressure, a hand lever, a conduit between said source and thrust cylinder, a valve in said conduit and controllable by said hand lever, an emergency device for applying the brake independently of said lever and electrical means insuring arrangement of said lever in the brake set position prior to release of the brake after operation of said emergency device.

15. A brake control, comprising a thrust cylinder adapted to lift an associated brake weight or the like to release the brake, a source of fluid under pressure, a hand lever, a conduit between said source and thrust cylinder, a valve in said conduit and controllable by said hand lever, an emergency device including a normally energized solenoid operating when deenergized to cause application of the brake independently of said lever, and electrical means including a push button operable by said lever only in the brake set position to energize said solenoid and permit release of the brake.

16. A brake control, comprising a thrust cylinder adapted to lift an associated brake weight or the like to release the brake, a source of fluid under pressure, a hand lever, a conduit between said source and thrust cylinder, a valve in said conduit and controllable by said hand lever, an emergency device including a normally energized solenoid operating when deenergized to cause application of the brake independently of said lever, and electrical means including a push button operable by said lever only in the brake set position to energize said solenoid and permit release of the brakes and a push button in the emergency device for maintaining the energy of the solenoid after it has been energized by said first-mentioned push button.

17. A brake control, comprising a thrust cylinder adapted to lift an associated brake weight or the like to release the brake, a source of fluid under pressure, a hand lever, a conduit between said source and thrust cylinder, a valve in said conduit and controllable by said hand lever, a second valve in said conduit normally permitting passage of the pressure medium therethrough under the control of the operator, and means for operating said last-mentioned valve in emergency to shut off communication between said valves and open the thrust cylinder to exhaust.

18. A brake control, comprising a thrust cylinder adapted to lift an associated brake weight or the like to release the brake, a source of fluid under pressure, a hand lever, a conduit between said source and thrust cylinder, a valve in said conduit and controllable by said hand lever, a second valve in said conduit normally permitting passage of the pressure medium therethrough under the control of the operator, and means for operating said last-mentioned valve in emergency to shut off communication between said valves and open the thrust cylinder to exhaust, said means comprising a third valve normally providing a pressure in said second valve holding the same in position permitting communication between the first valve and the thrust cylinder and devices for automatically operating said third valve in emergency to vary said pressure and permit operation of the second valve as aforesaid.

19. A brake control, comprising a thrust cylinder adapted to lift an associated brake weight or the like to release the brake, a source of fluid under pressure, a hand lever, a conduit between said source and thrust cylinder, a valve in said conduit and controllable by said hand lever, and an emergency device including a relay valve through which the pressure medium is normally admitted by the operator to the thrust cylinder and means automatically operable under predetermined conditions to close said relay valve to the operator and open the thrust cylinder to exhaust.

20. A brake control, comprising a thrust cylinder adapted to lift an associated brake weight or the like to release the brake, a source of fluid under pressure, a hand lever, a conduit between said source and thrust cylinder, a valve in said conduit and controllable by said hand lever, and an emergency device including a relay valve through which the pressure medium is normally admitted by the operator to the thrust cylinder, means automatically operable under predetermined conditions to close said relay valve to the operator and open the thrust cylinder to exhaust and adjustable means for governing the extent of brake application in emergency.

21. A brake control, comprising a thrust cylinder adapted to lift an associated brake weight or the like to release the brake, a source of fluid under pressure, a hand lever, a conduit between said source and thrust cylinder, a valve in said conduit and controllable by said hand lever, and an emergency device including a relay valve through which the pressure medium is normally admitted by the operator to the thrust cylinder and means automatically operable under predetermined conditions to close said relay valve to the operator and open the thrust cylinder to exhaust, said means comprising a third valve normally supplying sufficient pressure to said relay valve to hold the same open to the operator and having a projecting stem, means normally exerting pressure on said stem to hold the valve in normal condition, a dashpot for controlling the pressure exerted by said means and a solenoid for operating said dashpot to release the pressure on said valve stem in emergency and thereby cause automatic application of the brake.

22. A brake control, comprising a thrust cylinder adapted to lift an associated brake weight or the like to release the brake, a source of fluid under pressure, a hand lever, a conduit between said source and thrust cylinder, a valve in said conduit and controllable by said hand lever, and an emergency device including a relay valve through which the pressure medium is normally admitted by the operator to the thrust cylinder and means automatically operable under predetermined conditions to close said relay valve to the operator and open the thrust cylinder to exhaust, said means comprising a third valve normally supplying sufficient pressure to said relay valve to hold the same open to the operator and having a projecting stem, means normally exerting pressure on said stem to hold the valve in normal condition, a dashpot for controlling the pressure exerted by said means, a solenoid for operating said dashpot to release the pressure on said valve stem in emergency and thereby cause automatic application of the brake and means for controlling the rate of said brake application.

23. In a brake control, the combination of fluid pressure means normally under control of an operator for applying and releasing the brake, an emergency device for applying said brake independently of the operator, and adjustable means for controlling the extent of emergency application.

24. In a brake control, the combination of fluid pressure means normally under control of an operator for applying and releasing the brake, and an emergency device for applying said brake under predetermined conditions, independently of the operator, said device including a pivoted control member and a dashpot for operating said member and said dashpot comprising an oil cylinder, a piston thereon composed of separable parts between which the oil may pass from one side to the other of the piston during an initial stage of operation, and means providing a passage around said piston to permit the latter to settle and operate said member in applying the brake.

25. In a brake control, the combination of fluid pressure means normally under control of an operator for applying and releasing the brake, and an emergency device for applying said brake under predetermined conditions independently of the operator, said device including a pivoted control member and a dashpot for operating said member and said dashpot comprising an oil cylinder, a piston thereon composed of separable parts between which the oil may pass from one side to the other of the piston during an initial stage of operation, means providing a passage around said piston to permit the latter to settle and operate said member in applying the brake and means for controlling the rate of flow around said piston and thus the rate of emergency application of the brake.

26. A brake control system, comprising a control operable by an operator, and a control automatically operable in emergency independently of the operator, the emergency control interrupting the operator's power to release the brake but permitting him to continue his application thereof.

27. In a brake control system including a brake and a brake applying power source for mine hoists and the like, an emergency brake applying device adapted to govern the amount of brake application regardless of brake adjustment.

EZRA B. MEAD.